United States Patent
Margalit et al.

(10) Patent No.: US 8,483,088 B1
(45) Date of Patent: Jul. 9, 2013

(54) METHODS AND APPARATUSES FOR A NETWORK LANGUAGE CONFIGURATION API

(75) Inventors: Amit Margalit, Hod-Hasharon (IL); Uzi Zangi, Hod-Hasharon (IL)

(73) Assignee: Siverge Networks Ltd, Herzeliya (IL)

( * ) Notice: Subject to any disclaimer, the term of this patent is extended or adjusted under 35 U.S.C. 154(b) by 310 days.

(21) Appl. No.: 12/925,932

(22) Filed: Nov. 2, 2010

(51) Int. Cl.
*H04L 12/28* (2006.01)

(52) U.S. Cl.
USPC .......................................... 370/254; 370/408

(58) Field of Classification Search
USPC .......................................... 370/254, 256, 408
See application file for complete search history.

(56) References Cited

U.S. PATENT DOCUMENTS

| | | | |
|---|---|---|---|
| 7,680,632 B1 * | 3/2010 | Aldrich | 703/1 |
| 2005/0034110 A1* | 2/2005 | Lee et al. | 717/141 |
| 2005/0076104 A1* | 4/2005 | Liskov et al. | 709/223 |
| 2008/0168392 A1* | 7/2008 | Brooks et al. | 715/810 |
| 2008/0234872 A1* | 9/2008 | Vetter et al. | 700/286 |
| 2009/0076762 A1* | 3/2009 | Vetter et al. | 702/122 |

* cited by examiner

*Primary Examiner* — Brian D Nguyen

(57) ABSTRACT

A method and a utility to assist configuration of high complexity hierarchically and deeply channelized telecommunication systems using a network language configuration application program interface. The invented method and utility removes major complexity from the process of configuring such devices and systems by accepting a minimal high level description of the required configuration, including an input language used for defining rules and requirements.

16 Claims, 4 Drawing Sheets

METHODS AND APPARATUSES FOR A NETWORK LANGUAGE CONFIGURATION API

CROSS-REFERENCE TO RELATED APPLICATION

This application is a non-provisional application that claims the priority of U.S. Provisional Patent application No. 61/280,211 entitled "Methods and Apparatuses for a Network Language Configuration API," filed on Nov. 2, 2009, the teachings of which are incorporated by reference herein.

FIELD

Embodiments of the invention relate generally to the field of telecommunication infrastructure, and more data communication and processing.

BACKGROUND

Complex telecommunication devices and systems typically have thousands of telecommunication channels. The telecommunication channels may encapsulate other channel types and protocols. Such telecommunication devices and systems are configurable to support a network topology. The network topology is used to program, operate, and test the telecommunication devices and systems. The network topology is a hierarchical map of entities and their connections, including restrictions and limitations on possible connections, capable of dealing with multiple communications hierarchical protocol and channel types.

Conventional methods of determining, representing, and applying such configurations involve describing and programming thousands of registers. The entire system must be described at a very detailed level. This task of determining a topology-explicit description of a complex communication device, together with the generation of multiple outputs of this description, is labor intensive and, as such, is prone to error. As the telecommunications devices and system become more complex, the ability to determine a topology is increasingly problematic.

SUMMARY

For one embodiment of the invention, a method and apparatus is disclosed wherein a utility can capture and process the minimal sufficient representation required to determine a configuration expressed by a Network Language. Other features and advantages of embodiments of the present invention will be apparent from the accompanying drawings, and from the detailed description, that follows below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

A method and apparatuses for capturing and processing a network configuration, for one embodiment of the invention the network configuration is expressed by a Network Language specifying the minimal sufficient representation required to determine a configuration, supported by utility that can capture, process it and produce multiple outcomes for a variety of applications.

Minimal sufficient representation is defined as a reduced set of explicit network topology requirements sufficient for figuring out some necessary extended set of topology requirements which determines a legal topology compliant with the explicit requirements. As a simplified abstract example, if some system rule is such that channel type X can be implemented only as a sub-channel of channel type Y then in case one would like for example to specify a topology carrying only a single channel of type a X then the minimal sufficient representation can specify only the requirement for channel X while the implicit need for channel type Y is determined without the requirement that the need for channel type Y be specified.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable in a variety of settings in which a complex configuration can be efficiently specified and processed.

Exemplary Computing Device

Figure 1:
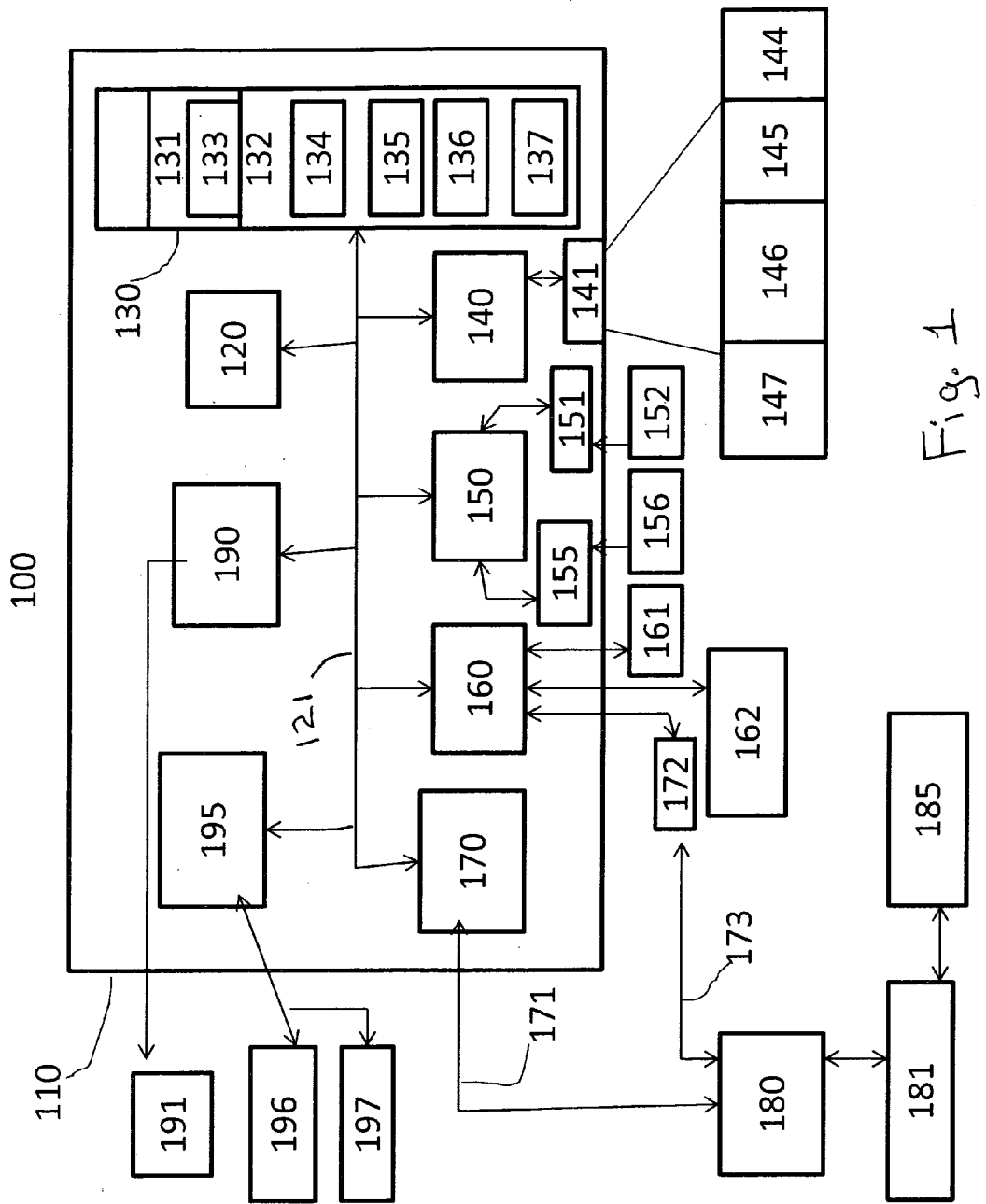
FIG. 1 illustrates an exemplary computing environment in which aspects of the invention may be implemented; illustrates a Network Language Configuration utility components and flow in accordance with one embodiment of the invention.

FIG. 1 and the following discussion are intended to provide a brief general description of a suitable computing environment in which the invention may be implemented. It should be understood, however, that handheld, portable and other computing devices and computing objects of all kinds are contemplated for use in connection with the invention. Thus, while a general purpose computer is described below, this is but one example, and the invention may be implemented with other computing devices, such as a client having network/bus interoperability and interaction. Thus, the invention may be implemented in an environment of networked hosted services in which very little or minimal client resources are implicated, e.g., a networked environment in which the client-device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during startup, is typically stored in ROM 131. RAM 132 typically contains'data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG.

1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195. The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 1'21 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET™'s languages and services, and in other distributed computing frameworks as well.

Exemplary Embodiment

Figure 2:
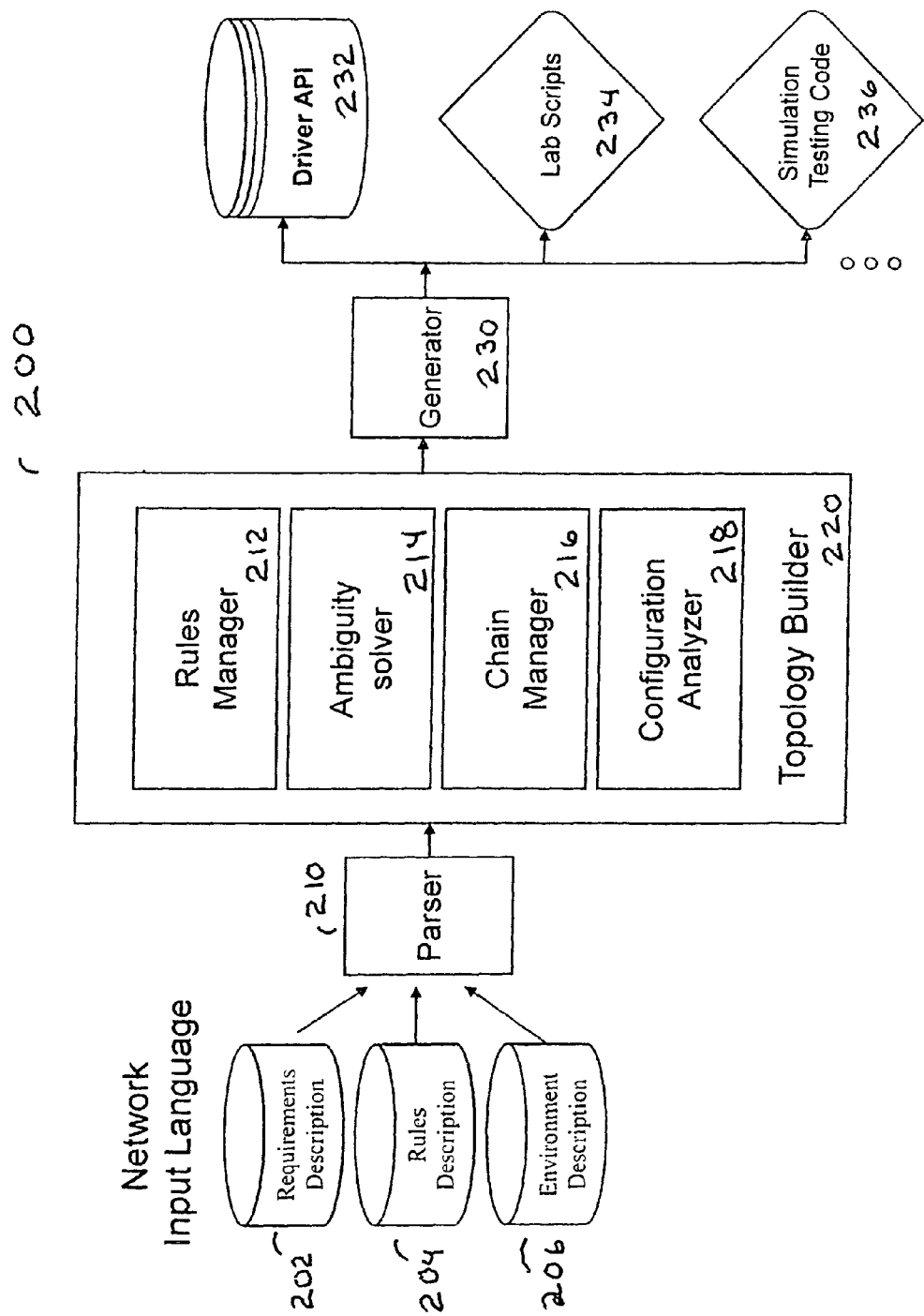
FIG. 2 illustrates a Network Language Configuration utility components and flow in accordance with one embodiment of the invention.

FIG. 2 illustrates a utility and a flow 200 composed of the following components.

Parser

The Parser 210 is the component receiving the user's input, parsing it, and passing the user's requests demands to the topology builder 220. The parser accepts a user-created file in a network-language format which represents the requested network configuration. The user file may be provided either directly by a text file or optionally using a GUI.

Network Input Language

The input language is a Requirement-Oriented Input Language and should enable the user to detail which network channels (such as TDM channels) will be in the generated topology. The following requirements may be supported by the input language, data channels of different types with different bandwidths, hints on required predecessors for requested channels, and extra configurations for requested channels. The descriptions of the requirements, rules, and environment, described more fully below, are provided in the Network Input Language of the present invention.

The full topology request can be described as a sequence of requirements, shown as requirements description 202. The requirements description 202 specify user requirements and include specification as to the number and type of channels. For example, the types of channels that may be specified such as requiring an ATM protocol link at a specified data rate to be carried over any sufficiently available carrying channel Further, the requirements description 202 may specify how the channels are used. For example, specifying that the ATM channel of the previous example is part of an IMA configuration The rules description 204 is used to describe the entities involved, their connections, the hierarchies allowed, working modes, environments, and relationships as well as the sizes of each hierarchy, etc. For example, the rules description 204 may define the interrelationships between various protocols that are applied to the communications system as well as to the channels used. The rules description 204 may be based on general knowledge or system specific information including proprietary information. The rules description 204 details the possibilities for topologies for a certain environment.

Additionally the network language may describe the configured environments using environment description 206 that help to resolve ambiguity. An environments variable is used to define some environment for certain specified requirements. For example, the environment description may provide a correlation between desired channels and the corresponding registers that may be programmed to effect implementation of the desired channels. Environments are labels that allow differentiating between major working modes. They are used as a global condition to allow the topology engine to do its job more easily by classifying parts of some of the hierarchies based on whether or not they can be part of an environment that the user has declared. Since the device can be used in more than one way, it is easier to resolve an ambiguity. Moreover, ambiguities can be further resolved by contextual knowledge.

Topology Builder

A topology engine, shown as topology builder 220 reads the parser's output, and then creates the topology. Topology builder 220 allows the creation of multiple mappings compliant with the requirements.

While processing the parser output, the topology builder 220 creates a tree of channels carrying links and protocols representing the network topology of the desired output to be generated. The requirements applied into data channels which are either leaves of the tree or branches explicitly specified by the requirements. The topology engine generates predecessors in which the data channels may be carried (carrier protocols) for them recursively, using rules from the rules description 202, which are used by the rules manager to create a complete topology chain tree data structure. Optionally a topology tree can be displayed by a GUI to better allow the end-user to explore the created topology.

Ambiguity Solver

Ambiguity may occur when the desired functionality as described by Network Input Language has multiple interpretations. In one embodiment, an ambiguity solver 214 provides hint nodes that are used to specify nodes which may be included into the mapping and help to resolve ambiguity. For one embodiment, the hints may include user preferences to aid in efficient topology determination.

Chain Manager

In one embodiment, a chain manager 216 obtains the configuration requirements and creates the possible channel chain according to rules and hints. For one embodiment, the channel chain created by the chain manager 216 defines how each channel is encapsulated through all hierarchies and encapsulations. As an example one chain may be a specific HDLC channel carried over a specific PDH channel carried over a specific CES channel carried over a specific Ethernet channel carried over a GFP channel.

Configuration Analyzer

In one embodiment, after the chain is built, each entity has to be configured. The whole chain is analyzed by a configuration analyzer 218 in order to determine which type of mapping it covers. The necessary required configurations for implementing the chain are configured for each entity according to the determined mapping.

Generator

The results or output from the topology engine 220 are received and read by the generator 230. The generator 230 uses the results of the topology engine 220 to generate various outputs such as a driver. API 232, lab testing scripts 234, and simulation testing code 236.

Thus, in one embodiment of the invention, a description of the requirements, rules and environment is received in a network input language in accordance with various embodiments of the invention. The descriptive information is then parsed and the parsed information is send to a topology builder. The network input language allows for the efficient generation of the topology that is automated and less prone to error than a manual generation of the topology. From the determined topology, various outputs are generated, including driver APIs, lab scripts, and testing code, among others.

Figure 3:
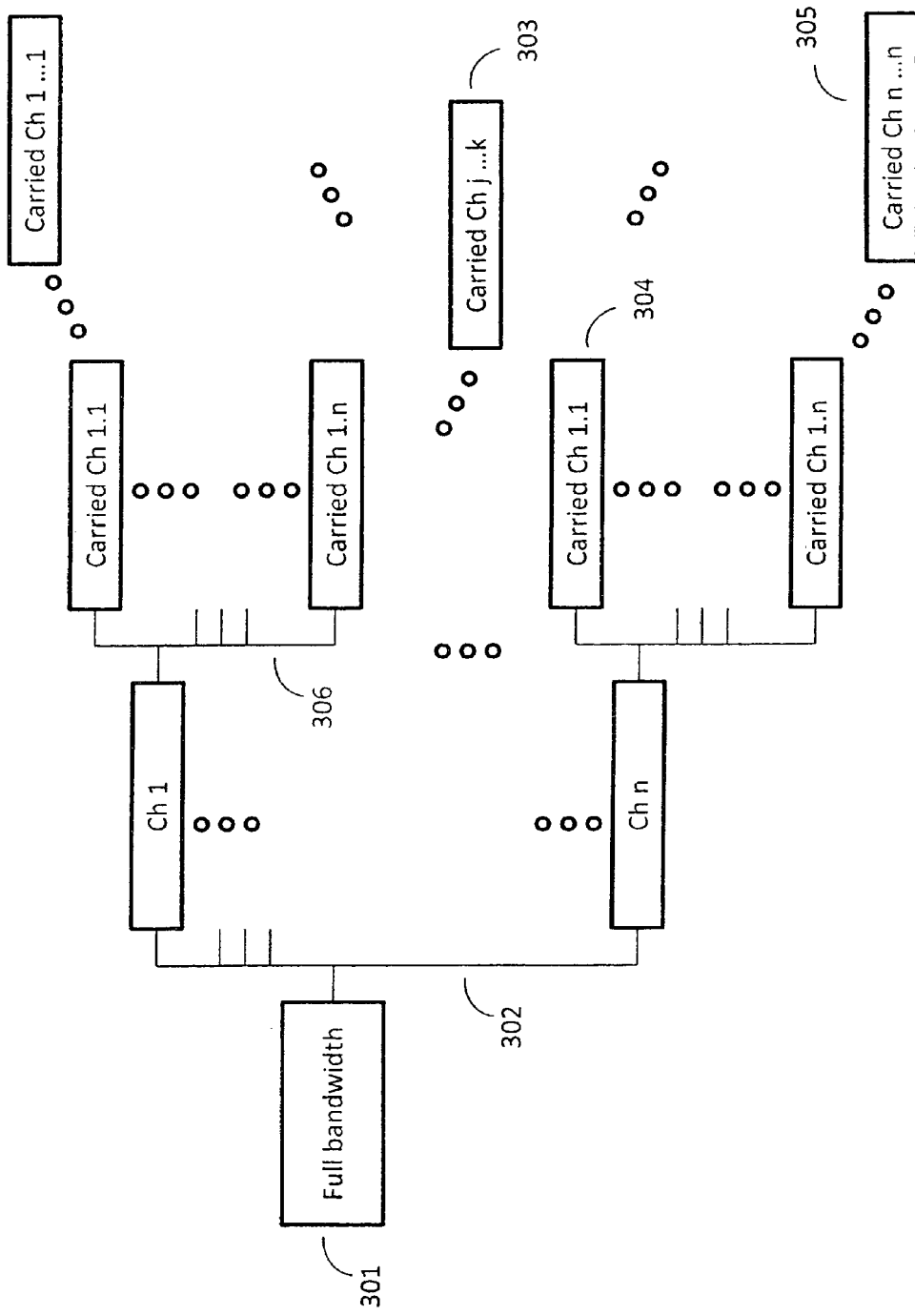
FIG. 3 illustrates an exemplary topology chain tree data structure that may used by the utility for resolving and composing a valid desired topology in accordance with one embodiment of the invention.

FIG. 3 illustrates an exemplary topology chain tree data structure that may be used by the utility for resolving and composing a valid desired topology in accordance with one embodiment of the invention.

The tree root 301 represents the full bandwidth of all channeling resources applied in the topology. The tree branches 302 represent the branching of the topology chain tree data structure into the multiple applied channels. Each channel in the tree hierarchy may branch further as represented by tree branches 306. This allows the topology chain tree data structure to represent it's multiple carried channels 304 including encapsulated channels, proceeding as deep as the topology hierarchy down to channels that do not carry or encapsulate any further channels, as represented, for example, by leaf channels such as 305. The tree is not necessarily symmetrically balanced and leafs may exist at multiple depth levels of the tree, as represented by leaf channel 303. A partial path within the tree representing multiple channels carried one within the other is referred as a 'chain.'

Figure 4:
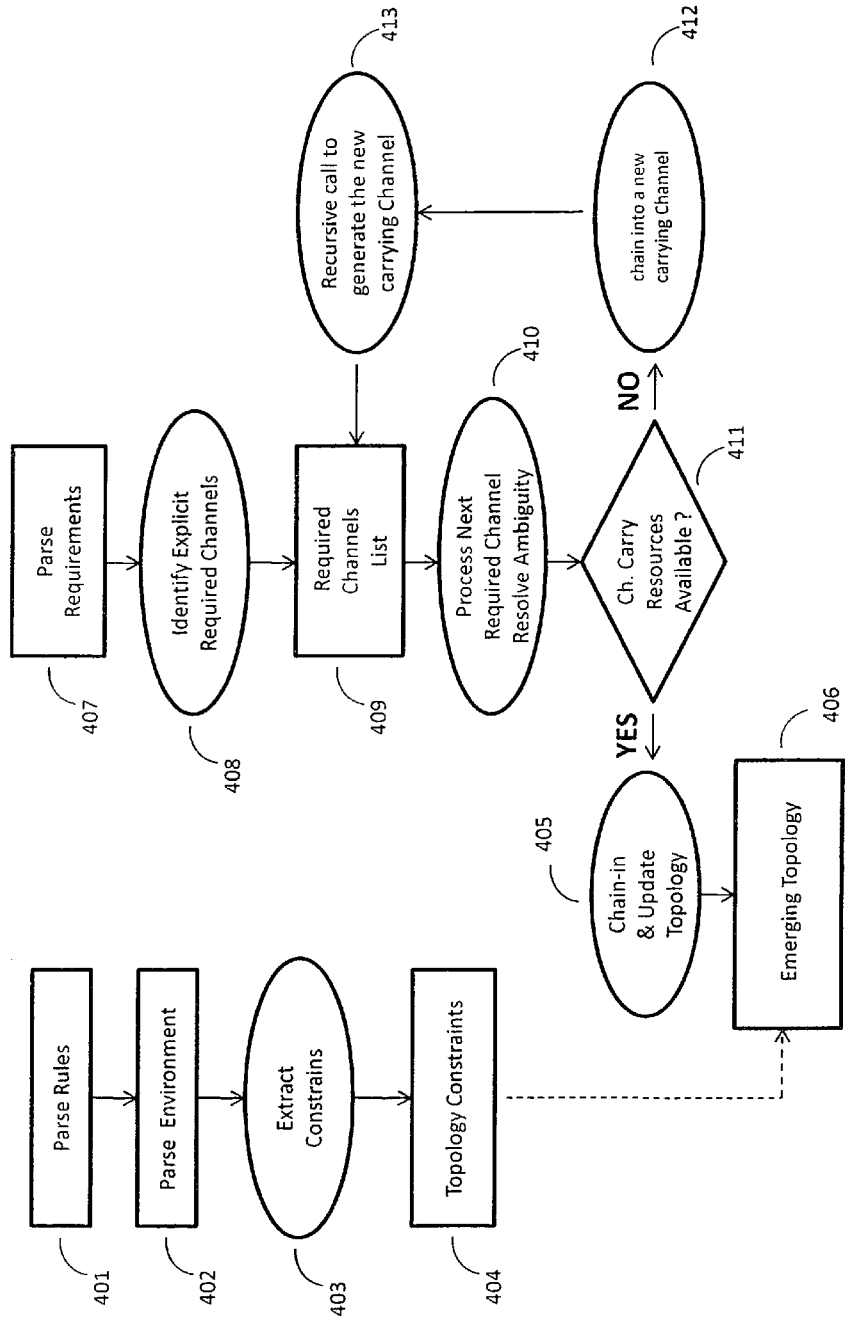
FIG. 4 illustrates a process for achieving a topology in accordance with one embodiment of the invention.

FIG. 4 illustrates a process for achieving a topology in accordance with one embodiment of the invention. FIG. 4 shows the recursive flow of processing the requirements until a valid topology is achieved.

Initially the topology rules information is parsed 401, also the environment information 402 is parsed, out of which topology constraints are extracted 403 composing the topology constraints information 404 which is maintained all along the emerging topology 406 composition.

Then requirements are parsed 407, all channels explicitly required are identified 408 and captured into the list of required channels 409 pending to be added into the topology. The required channels list is then iteratively processed, by processing each channel 410. Processing each channel includes resolving any ambiguity related to it and constructing all channels into the emerging topology 406. Resources availability for carrying the requested channel are checked 411. If there is a channel within the tree with available bandwidth for carrying the requested new channel, then it is chained into an existing channel 405 and the topology is updated accordingly. If there is no channel within the tree with available bandwidth for carrying the requested new channel, the requested channel is marked to be chained into a desired yet missing carrying channel 412. This is followed by a recursive call to generate that missing carrying channel 413 and chaining into it the dependent marked channel.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central site or, alternatively, one or more operations may be performed elsewhere.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A computer-readable storage medium containing instructions that when processed by a processor cause said processor to perform a method, the method comprising:
   defining a path of a telecommunications system, the path representing topology of a corresponding telecommunication device, wherein the topology specifies configuration requirements of the telecommunication device by a minimal sufficient representation required to determine a configuration expressed by a network configuration description language, the network configuration description language using an environments variable to resolve network requirements ambiguities;
   parsing the network configuration description language; and
   generating a networking topology compliant with a network specified by the network configuration description language.

2. The computer-readable storage medium of claim 1 wherein the method further comprises capturing the following:
   (a) device functionality requirements;
   (b) device supported application rules; and
   (c) device environment constraints.

3. The computer-readable storage medium of claim 1 wherein generating a network topology includes comparing requirements to networking rules and environment constraints and the generated network topology is used to generate outputs including a device driver API, a lab testing script, and a simulation testing code.

4. The computer-readable storage medium of claim 1 wherein a data structure representing a tree and chains of channels where carried one over the other is used to generate the networking topology.

5. The computer-readable storage medium of claim 1 wherein a configuration analysis is applied in a recursive manner, and wherein one or more newly identified required carrying channels are processed as if the one or more newly identified required carrying channels was provided as a primary requirement.

6. The computer-readable storage medium of claim 1 wherein a network requirements ambiguity is resolved by using user-provided hints.

7. A processor-implemented method of generating a representation of a topology of a telecommunications device, the method comprising:
   implementing a parser for receiving a user input in a network input language and parsing the received input;
   implementing a topology engine for creating a topology of a telecommunication device using the parsed input, wherein the topology specifies configuration requirements of the telecommunication device by a minimal sufficient representation required to determine a configuration and wherein the network input language uses an environments variable to resolve network requirements ambiguities; and
   implementing a compiler to generate a detailed representation of the topology of the telecommunications device.

8. The processor-implemented method of claim 7 wherein the user input is received as a user-created file in a network input language format.

9. The processor-implemented method of claim 8 wherein the network input language format is a requirement-oriented input language that supports data channels of different types with different bandwidths.

10. The processor-implemented method of claim 9 further comprising:
    implementing an ambiguity solver for resolving one or more ambiguities resulting from interpretations of the network input language wherein one or more ambiguities are resolved using user-provided hints.

11. The processor-implemented method of claim 10 further comprising:
    implementing a chain manager for obtaining the configuration requirements and using the configuration requirement to create one or more channel chains, wherein each channel chain defines how each data channel is encapsulated.

12. The processor-implemented method of claim 11, further comprising:
    implementing a configuration analyzer for analyzing one or more channel chains, wherein a configuration analysis is applied in a recursive manner, and wherein one or more newly identified required carrying channels are processed as if the one or more newly identified required carrying channels was provided as a primary requirement.

13. The processor-implemented method of claim 12, further comprising:
    implementing a generator for generating outputs based upon the topology, wherein the generated outputs include a driver API, a lab testing script, and a simulation testing code.

14. A computer-readable storage medium containing instructions that when processed by a processor cause said processor to perform a method, the method comprising:
    implementing a parser for receiving a user input in a network input language and parsing the received input;
    implementing a topology engine for creating a topology of a telecommunication device using the parsed input, wherein the topology specifies configuration requirements of the telecommunication device by a minimal sufficient representation required to determine a configuration;
    implementing a compiler to generate a detailed representation of the topology of the telecommunications device; and
    implementing a chain manager for obtaining the configuration requirements and using the configuration requirement to create one or more channel chains, wherein each channel chain defines how each data channel is encapsulated.

15. The computer-readable storage medium of claim 14 wherein the method further comprises:
    implementing a configuration analyzer for analyzing one or more channel chains, wherein a configuration analysis is applied in a recursive manner, and wherein one or more newly identified required carrying channels are processed as if the one or more newly identified required carrying channels was provided as a primary requirement.

16. The computer-readable storage medium of claim 15 wherein the method further comprises:
    implementing a generator for generating outputs based upon the topology, wherein the generated outputs include a driver API, a lab testing script, and a simulation testing code.

* * * * *